US010339172B2

(12) United States Patent
Kasterstein et al.

(10) Patent No.: US 10,339,172 B2
(45) Date of Patent: *Jul. 2, 2019

(54) SYSTEM AND METHODS THEREOF FOR ENHANCING A USER'S SEARCH EXPERIENCE

(71) Applicant: Doat Media Ltd., Tel Aviv (IL)

(72) Inventors: Rami Kasterstein, Givataim (IL); Amihay Ben-David, London (GB)

(73) Assignee: Doat Media Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/095,895

(22) Filed: Apr. 11, 2016

(65) Prior Publication Data

US 2016/0224670 A1 Aug. 4, 2016

Related U.S. Application Data

(63) Continuation of application No. 13/156,999, filed on Jun. 9, 2011, now Pat. No. 9,323,844.

(Continued)

(51) Int. Cl.
*G06F 16/44* (2019.01)
*G06F 16/34* (2019.01)
(Continued)

(52) U.S. Cl.
CPC ........ *G06F 16/44* (2019.01); *G06F 16/24578* (2019.01); *G06F 16/34* (2019.01);
(Continued)

(58) Field of Classification Search
CPC ................................................ G06F 17/30864
(Continued)

(56) References Cited

U.S. PATENT DOCUMENTS 5,911,043 A 6/1999 Duffy et al.
5,924,090 A 7/1999 Krellenstein
(Continued)

FOREIGN PATENT DOCUMENTS

EP 2288113 A1 2/2011
JP 2009278342 11/2009
(Continued)

OTHER PUBLICATIONS

International Searching Authority: International Search Report including "Written Opinion of the International Searching Authority" (PCT Rule 43bis.1) for the related International Patent Application No. PCT/US2011/039808; dated Feb. 9, 2012.
(Continued)

*Primary Examiner* — Syling Yen
(74) *Attorney, Agent, or Firm* — M&B IP Analysts, LLC (57) ABSTRACT

A system and method for enhancing search experiences of users are presented. The method includes receiving an input query and a metadata related to the input query sent from a user device; selecting at least one resource from a plurality of resources to respond to the input query; sending the input query as an input to the selected at least one resource; providing, for each selected resource, a single unique display segment within a display area on the user device; causing each selected resource to respond to the input within the corresponding unique display segment; and establishing a direct communication link between the at least one selected resource and the user device for at least enabling direct interaction between each selected resource and a user of the user device within the corresponding unique display segment.

20 Claims, 7 Drawing Sheets

Related U.S. Application Data (60) Provisional application No. 61/354,022, filed on Jun. 11, 2010, provisional application No. 61/468,095, filed on Mar. 28, 2011.

(51) Int. Cl.
  *G06F 16/43* (2019.01)
  *G06F 16/951* (2019.01)
  *G06F 16/2457* (2019.01)
  *H04L 29/08* (2006.01)

(52) U.S. Cl.
  CPC ............ *G06F 16/43* (2019.01); *G06F 16/951* (2019.01); *H04L 67/02* (2013.01)

(58) Field of Classification Search
  USPC ....... 707/706, 707, 712, 713, 722, 736, 758, 707/781, 999.003
  See application file for complete search history.

(56) References Cited

U.S. PATENT DOCUMENTS

| | | | |
|---|---|---|---|
| 6,101,529 A | 8/2000 | Chrabaszcz | |
| 6,484,162 B1 | 11/2002 | Edlund et al. | |
| 6,546,388 B1 | 4/2003 | Edlund et al. | |
| 6,560,590 B1 | 5/2003 | Shwe et al. | |
| 6,605,121 B1 | 8/2003 | Roderick | |
| 6,668,177 B2 | 12/2003 | Salmimaa et al. | |
| 7,181,438 B1* | 2/2007 | Szabo | G06F 17/30522 |
| 7,266,588 B2 | 9/2007 | Oku | |
| 7,302,272 B2 | 11/2007 | Ackley | |
| 7,359,893 B2 | 4/2008 | Sadri et al. | |
| 7,461,061 B2 | 12/2008 | Aravamudan et al. | |
| 7,529,741 B2 | 5/2009 | Aravamudan et al. | |
| 7,533,084 B2 | 5/2009 | Holloway et al. | |
| 7,636,900 B2 | 12/2009 | Xia | |
| 7,707,142 B1 | 4/2010 | Ionescu | |
| 7,721,192 B2 | 5/2010 | Milic-Frayling et al. | |
| 7,774,003 B1 | 8/2010 | Ortega et al. | |
| 7,783,419 B2 | 8/2010 | Taniguchi et al. | |
| 7,792,815 B2 | 9/2010 | Aravamudan et al. | |
| 7,899,829 B1 | 3/2011 | Malla | |
| 7,966,321 B2 | 6/2011 | Wolosin et al. | |
| 7,974,976 B2 | 7/2011 | Yahia et al. | |
| 8,032,666 B2 | 10/2011 | Srinivansan et al. | |
| 8,073,860 B2 | 12/2011 | Venkataraman et al. | |
| 8,086,604 B2 | 12/2011 | Arrouye et al. | |
| 8,312,484 B1 | 11/2012 | McCarty et al. | |
| 8,392,449 B2 | 3/2013 | Pelenur et al. | |
| 8,571,538 B2 | 10/2013 | Sprigg et al. | |
| 8,572,129 B1 | 10/2013 | Lee et al. | |
| 8,606,725 B1 | 12/2013 | Agichtein et al. | |
| 8,626,589 B2 | 1/2014 | Sengupta et al. | |
| 8,700,804 B1 | 4/2014 | Meyers et al. | |
| 8,718,633 B2 | 5/2014 | Sprigg et al. | |
| 8,793,265 B2 | 7/2014 | Song et al. | |
| 8,825,597 B1 | 9/2014 | Houston et al. | |
| 8,843,853 B1 | 9/2014 | Smoak et al. | |
| 2003/0018778 A1* | 1/2003 | Martin | G06Q 30/02 709/224 |
| 2004/0186989 A1 | 9/2004 | Clapper | |
| 2004/0229601 A1 | 11/2004 | Zabawskyj et al. | |
| 2005/0060297 A1 | 3/2005 | Najork | |
| 2005/0071328 A1 | 3/2005 | Lawrence | |
| 2005/0076367 A1 | 4/2005 | Johnson et al. | |
| 2005/0102407 A1 | 5/2005 | Clapper | |
| 2005/0138043 A1 | 6/2005 | Lokken | |
| 2005/0149496 A1 | 7/2005 | Mukherjee et al. | |
| 2005/0232423 A1 | 10/2005 | Horvitz et al. | |
| 2005/0243019 A1 | 11/2005 | Fuller et al. | |
| 2005/0283468 A1 | 12/2005 | Kamvar et al. | |
| 2006/0004675 A1 | 1/2006 | Bennett et al. | |
| 2006/0031529 A1 | 2/2006 | Keith | |
| 2006/0064411 A1 | 3/2006 | Gross et al. | |
| 2006/0085408 A1 | 4/2006 | Morsa | |
| 2006/0089945 A1 | 4/2006 | Paval | |
| 2006/0095389 A1 | 5/2006 | Hirota et al. | |
| 2006/0112081 A1 | 5/2006 | Qureshi | |
| 2006/0129931 A1 | 6/2006 | Simons et al. | |
| 2006/0136403 A1 | 6/2006 | Koo | |
| 2006/0167896 A1 | 7/2006 | Kapur et al. | |
| 2006/0190439 A1 | 8/2006 | Chowdhury et al. | |
| 2006/0200761 A1 | 9/2006 | Judd et al. | |
| 2006/0217953 A1 | 9/2006 | Parikh | |
| 2006/0224448 A1 | 10/2006 | Herf | |
| 2006/0224593 A1 | 10/2006 | Benton et al. | |
| 2006/0265394 A1 | 11/2006 | Raman et al. | |
| 2006/0271520 A1 | 11/2006 | Ragan | |
| 2006/0277167 A1* | 12/2006 | Gross | G06F 17/30905 |
| 2007/0011167 A1 | 1/2007 | Krishnaprasad et al. | |
| 2007/0055652 A1 | 3/2007 | Hood et al. | |
| 2007/0082707 A1 | 4/2007 | Flynt et al. | |
| 2007/0136244 A1 | 6/2007 | MacLaurin et al. | |
| 2007/0174900 A1 | 7/2007 | Marueli et al. | |
| 2007/0195105 A1 | 8/2007 | Koberg | |
| 2007/0204039 A1 | 8/2007 | Inamdar | |
| 2007/0300185 A1 | 12/2007 | Macbeth et al. | |
| 2008/0082464 A1 | 4/2008 | Ozzie et al. | |
| 2008/0104195 A1 | 5/2008 | Hawkins et al. | |
| 2008/0133605 A1 | 6/2008 | MacVarish | |
| 2008/0172362 A1 | 7/2008 | Shacham et al. | |
| 2008/0172374 A1 | 7/2008 | Wolosin et al. | |
| 2008/0222140 A1 | 9/2008 | Lagad et al. | |
| 2008/0256443 A1* | 10/2008 | Li | G06F 3/0486 715/700 |
| 2008/0306913 A1 | 12/2008 | Newman et al. | |
| 2008/0306937 A1 | 12/2008 | Whilte et al. | |
| 2008/0307343 A1 | 12/2008 | Robert et al. | |
| 2009/0013052 A1 | 1/2009 | Robarts et al. | |
| 2009/0013285 A1 | 1/2009 | Blyth et al. | |
| 2009/0031236 A1 | 1/2009 | Robertson et al. | |
| 2009/0049052 A1 | 2/2009 | Sharma et al. | |
| 2009/0063491 A1 | 3/2009 | Barclay et al. | |
| 2009/0077034 A1 | 3/2009 | Kim et al. | |
| 2009/0077047 A1 | 3/2009 | Cooper et al. | |
| 2009/0094213 A1 | 4/2009 | Wang | |
| 2009/0125374 A1 | 5/2009 | Deaton et al. | |
| 2009/0125482 A1 | 5/2009 | Peregrine et al. | |
| 2009/0150792 A1 | 6/2009 | Laakso et al. | |
| 2009/0210403 A1 | 8/2009 | Reinshmidt et al. | |
| 2009/0228439 A1 | 9/2009 | Manolescu et al. | |
| 2009/0234811 A1 | 9/2009 | Jamil et al. | |
| 2009/0234814 A1 | 9/2009 | Boerries et al. | |
| 2009/0239587 A1 | 9/2009 | Negron et al. | |
| 2009/0240680 A1 | 9/2009 | Tankovich et al. | |
| 2009/0265328 A1 | 10/2009 | Parekh et al. | |
| 2010/0030753 A1 | 2/2010 | Nad et al. | |
| 2010/0042912 A1 | 2/2010 | Whitaker | |
| 2010/0082661 A1 | 4/2010 | Beaudreau | |
| 2010/0106706 A1 | 4/2010 | Rorex et al. | |
| 2010/0184422 A1 | 7/2010 | Ahrens | |
| 2010/0228715 A1 | 9/2010 | Lawrence | |
| 2010/0257552 A1 | 10/2010 | Sharan et al. | |
| 2010/0262597 A1 | 10/2010 | Han | |
| 2010/0268673 A1 | 10/2010 | Quadracci | |
| 2010/0274775 A1 | 10/2010 | Fontes et al. | |
| 2010/0280983 A1 | 11/2010 | Cho et al. | |
| 2010/0299325 A1 | 11/2010 | Tzvi et al. | |
| 2010/0306191 A1 | 12/2010 | Lebeau et al. | |
| 2010/0312782 A1 | 12/2010 | Li et al. | |
| 2010/0332958 A1 | 12/2010 | Weinberger et al. | |
| 2011/0029541 A1 | 2/2011 | Schulman | |
| 2011/0029925 A1 | 2/2011 | Robert et al. | |
| 2011/0035699 A1 | 2/2011 | Robert et al. | |
| 2011/0041094 A1 | 2/2011 | Robert et al. | |
| 2011/0047145 A1 | 2/2011 | Ershov | |
| 2011/0055759 A1 | 3/2011 | Robert et al. | |
| 2011/0058046 A1 | 3/2011 | Yoshida et al. | |
| 2011/0078767 A1 | 3/2011 | Cai et al. | |
| 2011/0093488 A1* | 4/2011 | Amacker | G06F 17/30873 707/767 |
| 2011/0225145 A1 | 9/2011 | Greene et al. | |
| 2011/0252329 A1 | 10/2011 | Broman | |

(56) References Cited

U.S. PATENT DOCUMENTS

| | | |
|---|---|---|
| 2011/0264656 A1 | 10/2011 | Dumais et al. |
| 2011/0295700 A1 | 12/2011 | Gilbane et al. |
| 2011/0314419 A1 | 12/2011 | Dunn et al. |
| 2012/0158685 A1 | 6/2012 | White et al. |
| 2012/0198347 A1 | 8/2012 | Hirvonen et al. |
| 2012/0284256 A1 | 11/2012 | Mahajan et al. |
| 2013/0132896 A1 | 5/2013 | Lee et al. |
| 2013/0166525 A1 | 6/2013 | Naranjo et al. |
| 2013/0173513 A1 | 7/2013 | Chu et al. |
| 2013/0219319 A1 | 8/2013 | Park et al. |
| 2013/0290319 A1 | 10/2013 | Glover et al. |
| 2014/0007057 A1 | 1/2014 | Gill et al. |
| 2014/0025502 A1 | 1/2014 | Ramer et al. |
| 2014/0049651 A1 | 2/2014 | Voth |
| 2014/0279013 A1 | 9/2014 | Chelly et al. |
| 2015/0032714 A1 | 1/2015 | Simhon et al. |

FOREIGN PATENT DOCUMENTS

| | | | |
|---|---|---|---|
| JP | 20090285550 | A1 | 11/2009 |
| JP | 2011044147 | | 3/2011 |
| WO | 2007047464 | | 4/2007 |
| WO | 2010014954 | | 2/2010 |
| WO | 2012083540 | A1 | 6/2012 |

OTHER PUBLICATIONS

Nie et al., "Object-Level Ranking: Bringing Order to Web Objects", International World Wide Web Conference 2005; May 10-14, 2005; Chiba, Japan.

Qin et al., "Learning to Rank Relationship Objects and Its Application to Web Search", International World Wide Web Conference 2008 / Refereed Track: Search—Ranking & Retrieval Enhancement; Apr. 21-25, 2008; Beijing, China.

*Alice Corp v. CLS Bank International*, 573 US___, 134 S. CT. 2347 (2014).

Foreign Office Action for JP2015-537680 dated Dec. 6, 2016 from the Japanese Patent Office.

Kurihara, et al., "How to Solve Beginner's Problem, Mac Fan Supports" Mac Fan, Mainichi Communications Cooperation, Dec. 1, 2009, vol. 17, 12th issue, p. 92.

Notice of the First Office Action for Chinese Patent Application No. 201280004300.6, State Intellectual Property Office of the P.R.C., dated Oct. 26, 2016.

Chinese Foreign Action dated Mar. 13, 2017 from the State Intellectual Property of the P.R.C. for Chinese Patent Application: 201280004301.0, China.

Kurihara, et al., "How to Solve Beginner's Problem, Mac Fan Supports" Mac Fan, Mainichi Communications Cooperation, Dec. 1, 2009, vol. 17, 12th issue, p. 92, Translated.

Second Office Action for Chinese Patent Application No. 201280004300.6 dated Aug. 23, 2017, SIPO.

The Second Office Action for Chinese Patent Application No. 201280004301.0 dated Jan. 19, 2018, SIPO.

"Categories App Helps Organize iPhone Apps on your iPhone's Home Screen," iPhoneHacks, url: http://www.iphonehacks.com/2008/10/categoriesapp.html, pp. 1-4, date of publication: Oct. 5, 2008.

"iOS 4.2 for iPad New Features: Folders," Purcell, url: http://notebooks.com/2010/11/22/ios-4-2-foripad-new-features-folders/, pp. 1-5, date of publication Nov. 22, 2010.

Foreign Office Action for Patent Application No. 201380000403.X dated Jun. 2, 2017 by the State Intellectual Property Office of the P.R.C.

Chinese Foreign Action dated Sep. 3, 2018 from the State Intellectual Property of the P.R.C. for Chinese Patent Application: 201280004301.0, China.

\* cited by examiner

SYSTEM AND METHODS THEREOF FOR ENHANCING A USER'S SEARCH EXPERIENCE

CROSS-REFERENCE TO RELATED APPLICATIONS

This application is a continuation of U.S. patent application Ser. No. 13/156,999 filed on Jun. 9, 2011, now allowed, which claims the benefit of U.S. provisional application No. 61/354,022 filed on Jun. 11, 2010, and U.S. provisional application No. 61/468,095 filed on Mar. 28, 2011. The contents of the above-noted applications are hereby incorporated by reference.

TECHNICAL FIELD

The present disclosure generally relates to search engines, and more specifically to directing a search query to desired sources of answers and presentation of the answers on the display of a user's device.

BACKGROUND

Web search engines are increasingly becoming the method by which users seek information on the World Wide Web (herein "WWW"). As the WWW continues to grow in size, the task of finding relevant and pertinent information to a user's search query becomes increasingly complex. Not only do users expect answers to their search queries to be returned instantaneously, they also expect that the top answers returned relate specifically to what they are searching for.

Web search engines are computer programs accessible by web browsers which are designed to search the WWW and retrieve web pages that are files and documents accessible on the WWW and hosted by websites.

In general, web search engines generate large databases and indexes of websites and webpages accessible on the WWW, in a process known as web crawling. Such databases and indexes are updated frequently as websites and webpages are added, deleted, and changed very frequently on the WWW. The databases of a web search engine may include information regarding each webpage in the databases such as the actual words on the webpage, and the index usually includes information relating to how a webpage should be classified and indexed in the databases. When a user submits a search query to a web search engine, the web search engine uses its indexing system to determine which webpages in its databases match the search query it was provided with. The web search engine may be able to rank the webpages in its database which most closely match the search query it was provided with. The webpages which most closely match the search query are returned to the user and usually presented in the form of a list, also known as search results, a search results list, or even an 'answer' to a user's search query.

There are two types of searching methods that can be performed by web search engines. In the first method, as implemented by search engines, such as Google® and Bing, the input query is checked only against the indexes and databases maintained by the search engine. That is, a search query input to a Google's search engine is fully served by Google's databases and indexes and will not be relayed to other engines (e.g., to retrieve the result).

Web search engines such as Dogpile®, Ask.Com® and Metacrawler® are meta-search engines, also known as secondary search engines, which provide a submitted search query to various other web search engines and present search results which have been aggregated from a plurality of web search engines to a user. Other types of known web search engines include vertical comparison engines as well as widget and gadget-based personal homepage dashboards. Vertical comparison engines are search engines which compare items for sale from various other websites. For example, PriceGrabber.Com® and Shopzilla®.com enable a user to compare the price of a given product at multiple stores.

The search results returned from each of the web search engines provided with the search query are compared to eliminate duplicate items in the search results returned by different web search engines. The comparison may also include counting the number of times a particular file or document is returned across the web search engines for a given search query. Then, the returned search results from each of the web search engines provided with the search query are ranked. Ranking substantially refers to the procedure wherein the relevancy of a returned file or document to the received search query is determined. The returned search results from all of the web search engines are ranked, thereby determining which items in the search results are possibly more relevant as answers to the user's search query than others. Many methods for ranking webpages and websites, files and documents are known in the art, each of which use different criteria for determining the relevancy of a given item in a search results list to the user's search query.

Finally, the search results from each of the web search engines are aggregated into a combined search results list. The combined list may be combined based on the comparing of search results in and/or the ranking of search results. The webpage(s) displaying the search results substantially include a list of links to websites and webpages related to the search query. In some cases, the return search results would also include images, videos, news feeds, and the like, which are also displayed to the user.

Widget and gadget-based personal homepage dashboards enable a user to design a personalized homepage or personal web portal which may include a plurality of applications known as widgets or gadgets that can provide a user with information. Netvibes®.com, iGoogle and My Yahoo!® are all examples of widget and gadget-based personal homepage dashboards.

Figure 8:
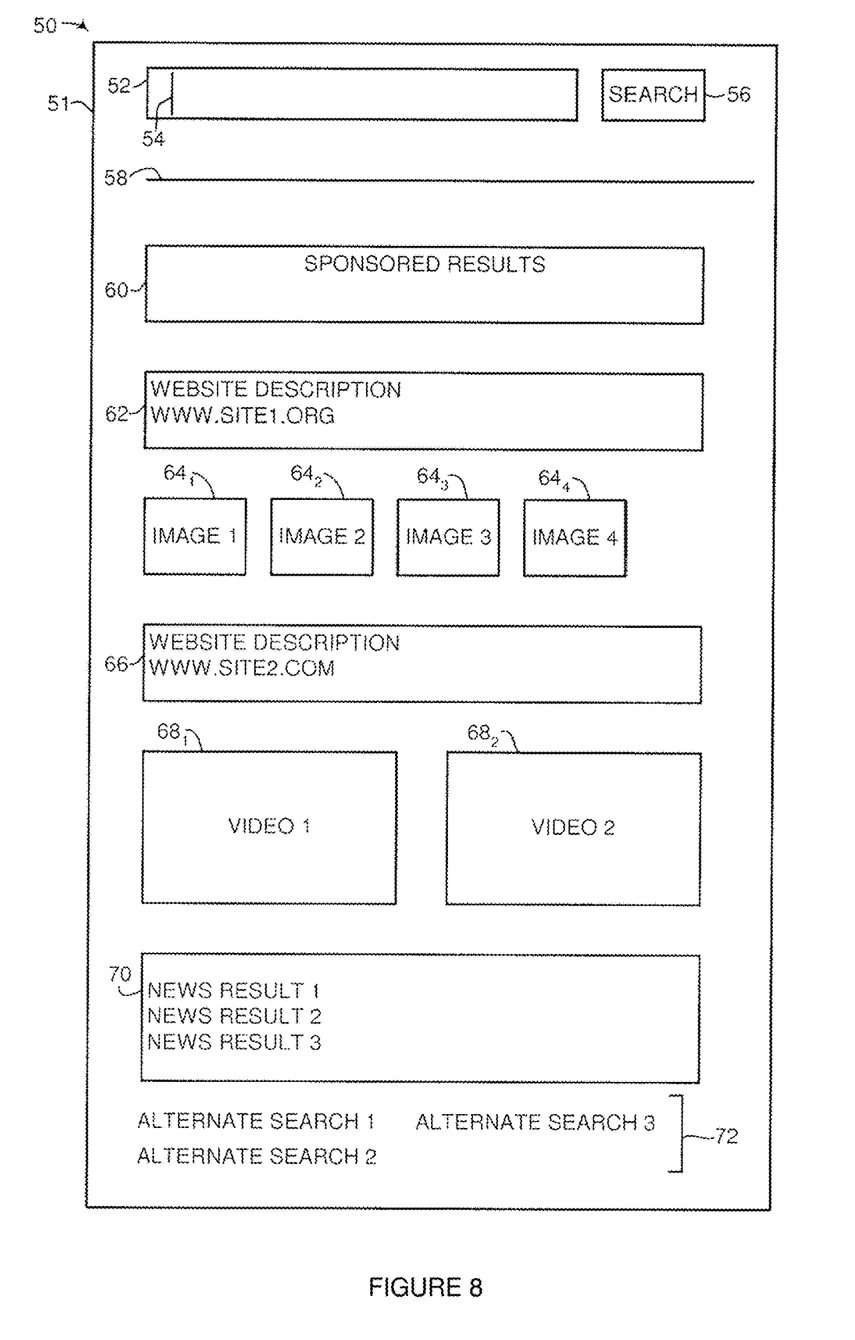
FIG. 8 is schematic illustration of a search results webpage using a conventional web search engine.

FIG. 8 shows a schematic illustration showing a search results webpage 50 that includes a window 51 in which the search results are shown. The window 51 includes a search bar 52 and a cursor 54, wherein a user can type in a search query, as well as a search button 56 for submitting the search query to a web search engine. As in standard web search engines, the window in which a user can interact with the web search engine is substantially divided into two by a line 58. Above line 58 is the interface in window 51 for submitting a search query, whereas below line 58, search results are presented to the user.

In the exemplary FIG. 8, a user submitted a search query to a web search engine and received search results which are shown schematically below line 58. First shown are sponsored search results 60 and then a first website description 62 for a first website. First website description 62 represents a description of a website which substantially matched the user's search query as determined by the web search engine. Below first web site description 62 are four images 641, 642, 643 and 644. Each of four images 641, 642, 643 and 644 represents images which also substantially matched the user's search query as determined by the web search engine. The web search engine then returned a second website description 66 for a website as well as two videos 681 and 682, all of which substantially matched the user's search query. Below the two videos 681 and 682, the web search engine also returned news results 70, which are substantially links to documents from news websites that mention words in the user's search query. Below the news results 70, the web search engine also returned a list of alternate search queries 72 which are similar to the search query submitted by the user via search bar 52.

The schematic search results webpage 50 would be returned whether the user performs the search query using a PC, a smartphone, a tablet device, or devices from which a user can provide a query from and receive a response to. Web search engines have not substantially adapted the return webpages to the device generating the query, and hence displaying the results. The user experience when reviewing the results is very limited, as the user has to scroll down and review each web site's description returned by the text. This approach is very inconvenient when trying to review the results over, e.g., a smartphone having a small display.

Furthermore, while the results as displayed to users maybe catered to the user's personal preferences, they do not reflect a personalized, real-time and deep web content. This is due to the fact that prior art search engines provide the links based on a crawl function. That is, the data provided reflects content stored on the server(s) of the search engine, rather than data that is provided by a resource to which a link is provided to. Hence, such a resource may change its content and provide useless information once accessed based on the link provided.

It would be therefore advantageous to provide a solution that would overcome the limitations of existing web search engines.

SUMMARY

Certain embodiments disclosed herein include a method for enhancing search experiences of users. The method includes receiving, at a search server, an input query and a metadata related to the input query sent from a user device; selecting, based on an analysis of the input query, at least one resource from a plurality of resources to respond to the input query; sending the input query as an input to the selected at least one resource, wherein the input is generated based on the selected at least one resource; providing, for each of the at least one selected resource, a single unique display segment within a display area on the user device, wherein content displayed in each unique display segment corresponds only to content retrieved by the corresponding selected resource; causing the at least one selected resource to respond to the input within each corresponding unique display segment; and establishing a direct communication link between the at least one selected resource and the user device for at least enabling direct interaction between the at least one selected resource and a user of the user device within each corresponding unique display segment.

Certain embodiments disclosed herein also include a system for enhancing search experiences of users. The system includes a database containing information respective of a plurality of resources and metadata respective of an experience classification; an interface for receiving an input query and a metadata related to the input query sent from a user device; a computing unit for: selecting, based on an analysis of the input query, at least one resource from the plurality of resources to respond to the input query, opening a display area on the user device including at least one display segment and associating each display segment with one of the selected at least one resource, and establishing a direct communication link between the at least one selected resource and the user device for at least enabling direct interaction between the at least one selected resource and a user of the user device within each corresponding unique display segment; and an interface for sending the input query as an input to the selected at least one resource, wherein the input is generated based on the selected at least one resource, wherein the selected at least one resource responds to the input within each corresponding unique display segment.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to certain exemplary embodiments, in order to perform an effective search technique, a user device communicates with a search server and provides a search query that is comprised of search terms and/or, when applicable, search metadata. According to certain embodiments, the metadata may be provided by the user of the user device, the user device, and/or a search server as described in further detail herein below. The metadata maybe respective of certain types of user input queries that the resource can handle. The search server is configured to analyze the search query and provide the search terms to appropriate resources that can provide answers to the query and hence is also referred to as a resource publisher. The query is provided to the resources in the way that the resource can handle the query and respond thereto. If the query contains metadata, it may be used to determine such appropriate resources. The search server further allocates on the user device a display area having display segments for at least a portion of the resources deemed appropriate to answer the query. Each resource provides the answers directly to its corresponding display segment on the user device without further intervention by the search server, thereby allowing a resource, described in further detail herein below, to provide a place where the resource is free to provide a response to the query in any way it may wish, including, without limitation, opening a web page, allow interactions with one or more resources and more.

Figure 1:
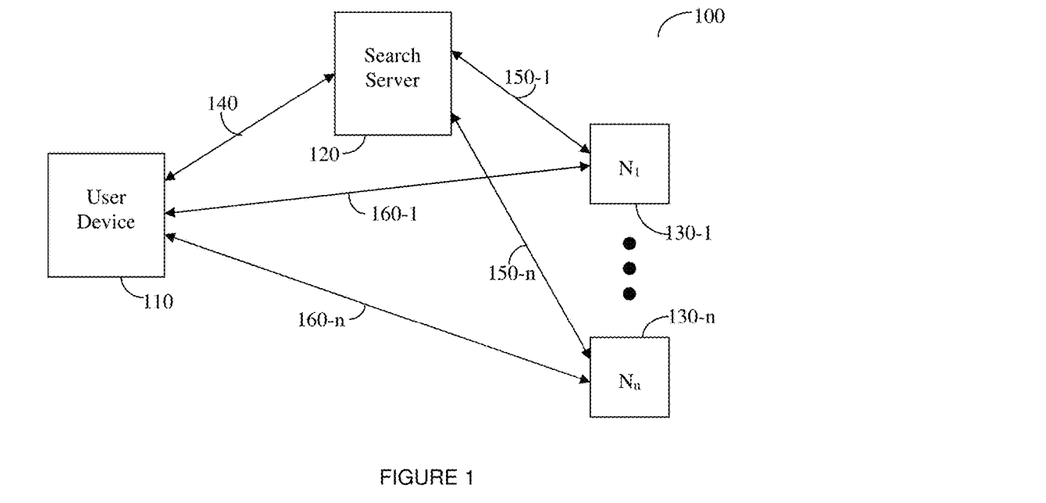
FIG. 1 is a schematic diagram of the operation of the system in accordance with an embodiment.

FIG. 1 depicts an exemplary and non-limiting schematic diagram 100 of the operation of the system in accordance with an embodiment. A user of a device 110 submits over communication link 140 a query to the search server 120. A query comprises search terms and in some embodiments also metadata about the user and the user device 110. Such metadata may include, but is not limited to, search history, time, a device type, social friends, a location, a keyword, a category, and more. It should be further noted that responsive to entering query search terms, metadata terms may be provided by the search server 120 and displayed on the user device 110 in an interactive loop allowing the user of the user device 110 to further refine the query.

The search server 120 is configured to receive the query and process it to determine which resources from a plurality of resources 130-1 through 130-n are the most appropriate to submit the query to. The resources 130 includes, but are not limited to, a plurality of web search engines, servers of content providers, vertical comparison engines, servers of content publishers, and so on. It should be further noted that according to an embodiment, a resource can respond within an application that is installed on the user device 110. This allows, for example and without limitation, the launch of the iTunes® app if the query is music related.

For example, if the query term is "Hector Berlioz" then it is most likely that the best answers will be from resources that are capable of handling classical music queries. In accordance with an embodiment, the search server 120 is capable of determining which would be the most appropriate resources 130 to address the query to, either by actively checking what a resource 130 can provide or by, for example, registration of a resource 130 to certain categories, such as "music" or "carpentry tools", as well as, but without limitation, registration for certain keywords. Moreover, and as further explained herein below, the search server 120 may monitor the use of the user on the user device, but not within the application in a display segment thereby maintaining user privacy with respect to the interaction with a resource 130, to determine which of the resources 130 was the most appropriate for the user and to influence thereby future references to that resource.

In one embodiment, an operator is used between the search term and a metadata term, for example, the operator "@". The metadata term may be, but is not limited to, a category, a specific resource 130, a location, a keyword, and so on. A user can therefore submit a query for "Beethoven @ music" which would then be directed to, and answered by, selected resources 130 that the server 120 determines to be capable of answering music related queries. However, the query "Beethoven @ Movies" will be directed to potentially a different group of sources from the resources 130, and one result could be the movie Beethoven with a Saint Bernard dog named Beethoven as a star of the movie. The function of this operator will be discussed in more detail herein below. The operator can be provided by the user or selected between suggestions from the search server 120.

The search server 120, once one or more appropriate resources from the resources 130 have been identified, sends search requests to such selected resources 130 over communication links 150-1 through 150-n. It is not necessary to send the search requests, or a variation thereof, to all the resources 130-1 through 130-n but only to the subgroup that is determined to be relevant for the query.

The search server 120 further provides a display area containing display segments unique for each of the resources 130 determined to be appropriate for receiving the query, and such appropriate resources are directed to communicate directly with their respective display segment on the user device over communication links 160. Thus, the search server 120 establishes a direct communication between the resources 130 respective display segments. The display area may be an application of its own right, such as, but not limited to, a web browser.

In one embodiment, and as further explained herein below, only a portion of the selected resources of the resources 130 are designated with a display segment. Those selected resources that do not have an allocation of a display segment are approached when the user requests, for example, information from additional selected resources. By mere example, if there are thirty selected resources the display area may be designed to contain only ten display segments, therefore only the top ten of the selected resources are associated with a display segment. The other selected resources can be associated with the display segment upon a request for more information made by the user and as further explained below. As a result it is not necessary for the server 120 to have any specific information or data regarding the actual content residing on the resource, unlike the prior art. The only ability needed is to determine which resource of the resources 130 is appropriate to provide a certain answer to a query and, potentially, is a resource trusted by a user of the device 110.

It should be noted that the search server 120 provides the query, or search terms thereof, to a resource 130 in a communication format that is proper for that specific resource thereby enabling search of such resources that require structured interface to perform any kind of successful search. The search server 120 is therefore configured to communicate directly with a variety of resources each having its own requirement to respond to a query. It should be noted that the communication links 140, 150, and 160 may occur over a common network such as, but not limited to, a local area network (LAN), a wide area network (WAN), a metro area network (MAN), the world wide web (WWW), the Internet, a wired network, a wireless network, and the like, as well as any combination thereof.

It should be noted that although not shown in FIG. 1, the search server 120 may also include a database for maintaining information respective each of the resources, an interface for receiving a query from a user device, an interface for sending queries to the selected resources a computing unit, e.g., a processor, adapted to perform the at least tasks of selecting resources and opening the display area and segments on the user device, and allocating such display segments to resources. These tasks are described in greater detail below.

Figure 2:
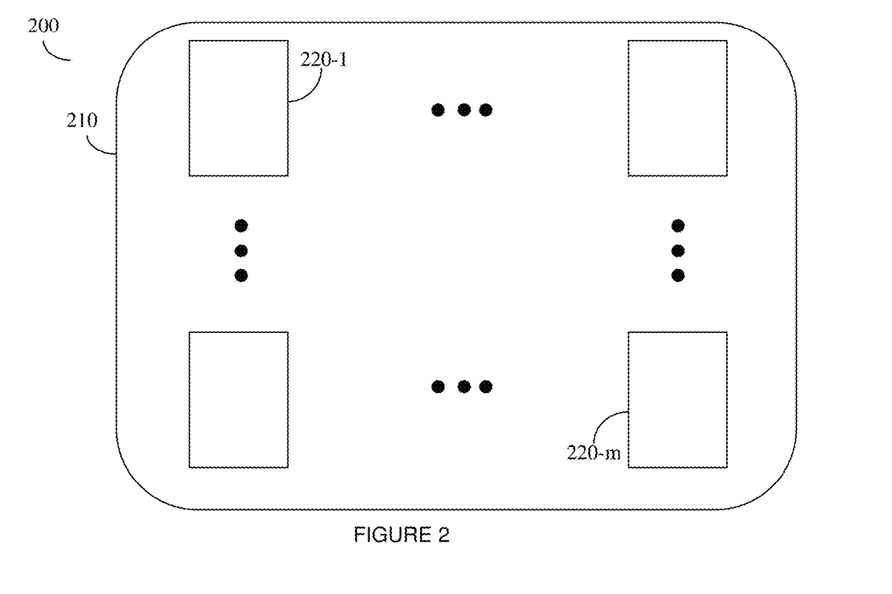
FIG. 2 is a display area with display segments on a display screen of a typical personal computer (PC) in accordance with an embodiment.

FIG. 2 shows an exemplary and non-limiting display area 210 on a display screen 200 of a typical personal computer (PC) rendered in accordance with an embodiment. It should be understood that a PC is provided here as an example. Other devices having displays that are large enough to display a plurality of items large enough to be readily recognized include the likes of screens of notebook computers, tablet computers, and the like. It is further understood that display screen 200 can be an independent application or hosted and displayed in another application such as a web browser. The server 120 may further determine the order of the display areas based on various parameters that are outside of the scope of the instant patent application.

The display area 210 is allocated by the search server 120 to a plurality of display areas 220, from display segment 220-1 through display segment 220-m (when m is an integer number). The number of actual display segments 220 corresponds to the number of appropriate resources 130 to which the query was referred to by the server 120. Each display segment 220 is allocated to one of the appropriate resources 130 which interacts with the user from within that display segment. In one embodiment, only a portion of the selected resources of the resources 130 is designated with a display segment. Those selected resources that do not have an allocation of a display segment are approached when the user requests, for example, information from additional selected resources. In yet another embodiment, a scroll function can be implemented as part of the display area 210 to enable viewing of otherwise hidden display segments. One of ordinary skill would readily realize that rather than the prior art approach of providing links based on data stored at the search engine level, for example, the Google® style, in response to a query, in accordance with an embodiment, one or more display segments 220 that contain the response from the appropriate resources 130 are provided to the user device 110, without storing at the search server 120 any such data.

It should be further noted that one display segment 220 may contain search engines, such as Google® search engine, including links, as a fully functional resource publisher within a display segment 220. The advantage of the approach where content of a resource 130 is displayed within a display segment being that the search server 120 does not control what is presented to the user as is done in prior art solutions, as well as having access to the application itself immediately upon delivery of the results to the query. For example, when a "Toy Story" query is searched, one of the resources may be a Netflix® service while the other is Google®. Thus, one display segment 220 will present search results in a webpage format as generated by a Google® search engine, while another display segment 220-n will run a Netflix® player playing the movie as streamed from Netflix's servers. Thus, according to this example, the response to the query is an active application running directly by the resource publisher selected in the display segment 220-n.

An active application as discussed herein includes, but is not limited to, a web application, and a native application. A web application is any application that can be accessed on the WWW via a web browser and typically use a HTML format. Typically, a web application is executed by a web server and the user device (client) receives the processing results, for example, a web application for booking flight tickets. A native application, as defined herein, is any software application that runs on the user device 110 and can, but is not required, to be accessed by using the Internet or via a connection to the Internet. For example, native applications are installed on PCs, smartphones, or tablet computers (e.g., Apps for Apple's iPhone® and iPad®) are such examples of Internet applications. Typically, such applications do not require a web browser to access information and be executed by the user device (e.g., a smartphone). Examples for native applications include applications that play movies, applications that download songs, applications through which a user can order a pizza, applications through which a user can request an electrician to make a house call, and the like.

Figure 3:
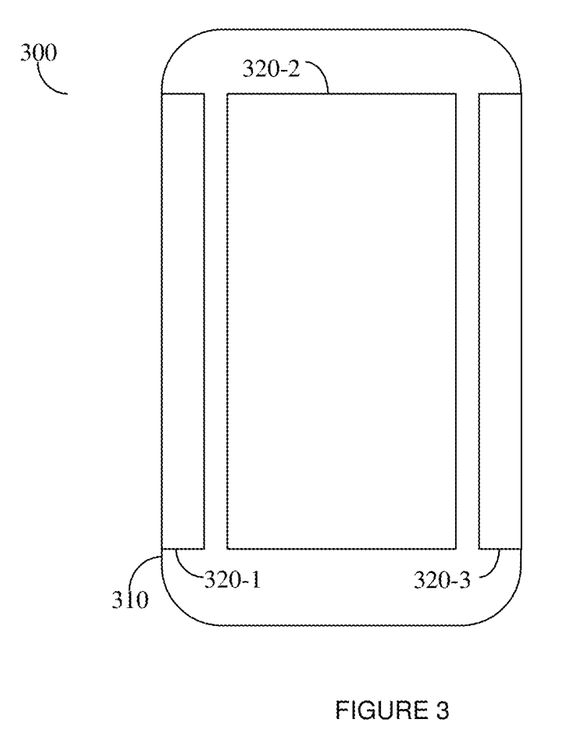
FIG. 3 is a display area with display segments of a mobile device in accordance with an embodiment.

FIG. 3 shows an exemplary and non-limiting display area 310 of a mobile device screen 300 rendered in accordance with an embodiment. The mobile device typically has a small screen form factor and therefore display techniques that differ from that shown with respect to a PC in FIG. 2 should be used. As noted above, as a result of a query entered by a user, one or more appropriate resources 130 respond with application data that is directed into corresponding display segments 320. Because of the nature of the smaller screen the center of the display area 310 is used for one display segment, for example display segment 320-2, while from the left and the right there are other display segments, 320-1 on the left and 320-3 on the right, that can be viewed by using an appropriate gesture or other means of scrolling from left to right or right to left.

Figure 4:
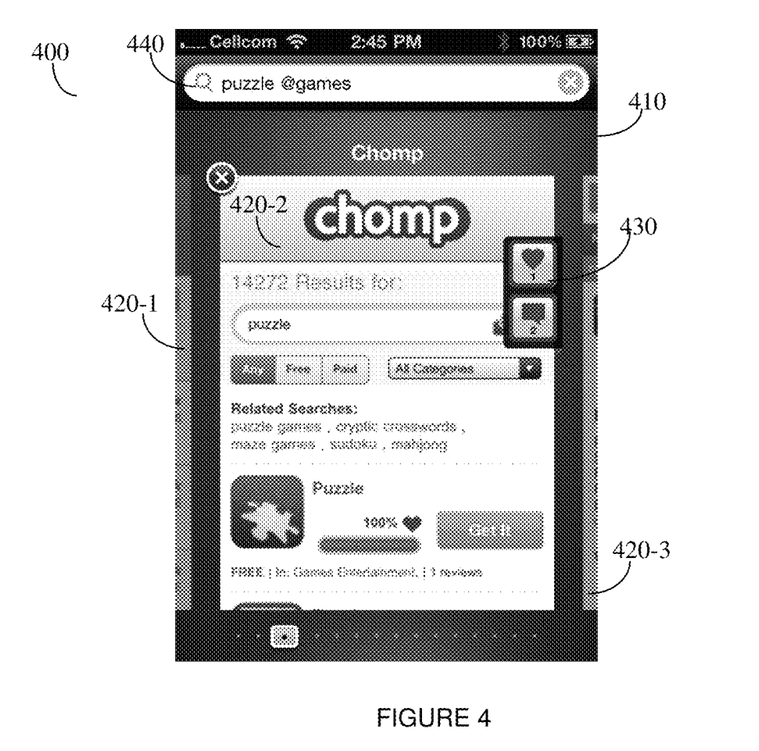
FIG. 4 is a screenshot of a screen of a mobile device displaying a display area with display segments in accordance with an embodiment.

FIG. 4 shows an exemplary and non-limiting screenshot 400 off of a screen of a typical mobile device displaying a display area 410 and display segments 420 thereon, rendered in accordance with an embodiment.

In one embodiment, icons 430 may enable the user of the user device to provide feedback to the search server 120 with respect to the current display segment, for example, display segment 420-2. For example, and without limitation, an icon may allow providing a feedback that the information is useful and liked by the user, another icon may provide the opposite feedback, and so on. This feedback may be used for both determination of the relevance of the information provided by the resource responsive of the query, as well as to the user's preferences. Thus, the feedbacks provided by the users are utilized to adaptively update the selection of resources for users' queries. The user can enter a query that may contain search terms as well as metadata terms as explained hereinabove, in window 440.

Figure 5A:
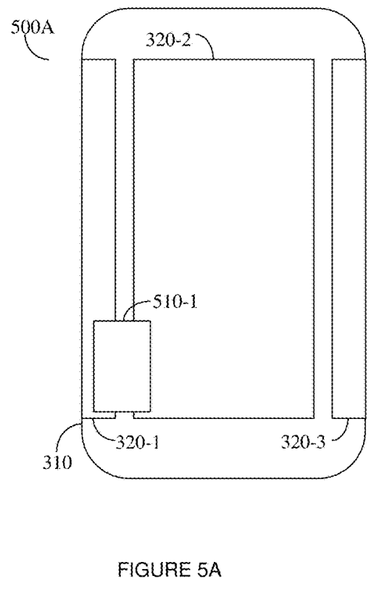
FIGS. 5A and 5B are display areas of a mobile device with a selection mini-display segment slider in accordance with an embodiment.
Figure 5B:
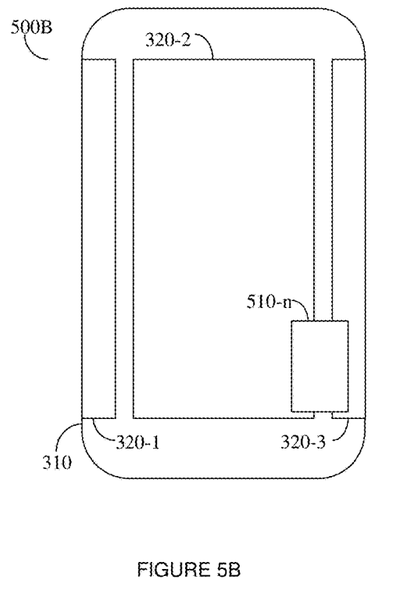

FIGS. 5A and 5B depict exemplary and non-limiting display areas 310 of a mobile device with a selection mini-display segments 510 displayed in accordance with several exemplary embodiments. In FIG. 5A, a mini-display segment 510-1 corresponds to the larger display segment 320-1 which is mostly, but for its most right portion, outside of the display area 310. The mini-display segment 510 enables the display of not currently visible display segments 320 in a fully functional application form. A plurality of such mini-display segments can be shown up to the last one, for example 510-m as shown in FIG. 5B and being viewed in a slider fashion from the first to the last rolling one the display area. Corresponding non-limiting screenshots 600A and 600B are respectively shown in FIGS. 6A and 6B.

Figure 6A:
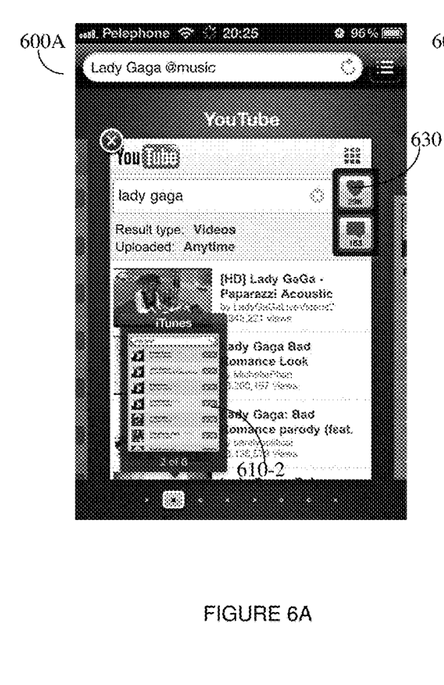
FIGS. 6A and 6B are screenshots of screens of a mobile device displaying a display area with a selection of mini-windows in accordance with an embodiment.
Figure 6B:
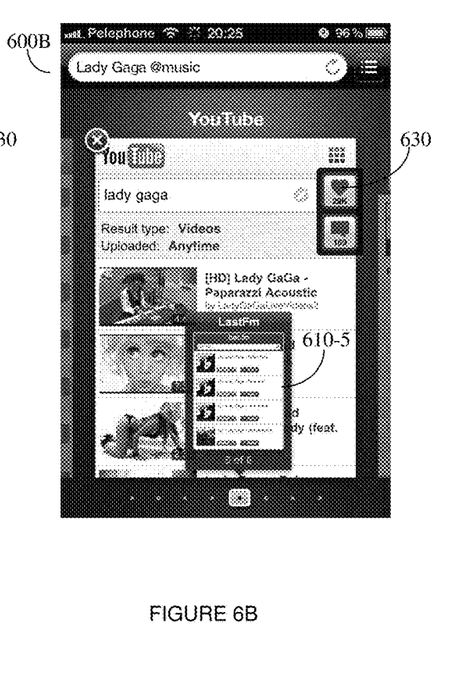

In one embodiment, only a portion of the selected resources of the resources 130-1 through 130-n are designated with a display segment. Those selected resources that do not have an allocation of a display segment are approached when the user requests, for example, information from additional selected resources. Mini-display segments (e.g., mini-display segments, labeled 610-2 and 610-5, are shown, while a plurality of others, such as 610-1, 610-3, 610-4, 610-6, etc., are not shown for display clarity) correspond in this case to the number of display segments made available, and additional mini-display segments are added once additional information from other selected resources is requested. The display segments may also include icons 630 enabling the user of the user device to provide feedback to the search server 120 with respect to the current display segment.

In accordance with an embodiment, the display segments (shown in FIGS. 3 through 6) may include social tools for sharing the retuned results with contacts stored in a social network website, such as Facebook® or LinkedIn®.

Figure 7:
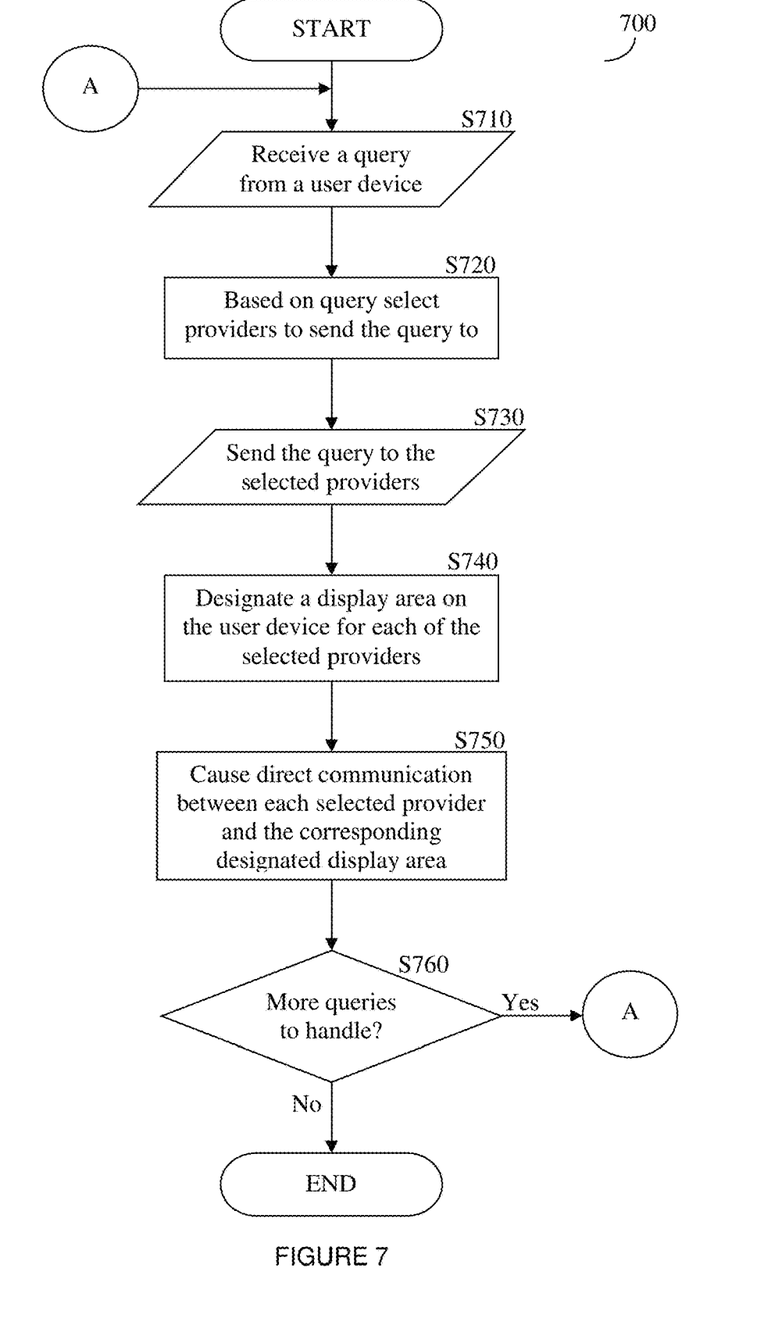
FIG. 7 is a flowchart describing the operation of the system.

FIG. 7 shows an exemplary and non-limiting flowchart 700 describing the operation of the search server 120 according an embodiment. In S710, a query from a user device, for example, a user device 110 is received. In one embodiment, the metadata is automatically populated and provided to the user, for example, through a display of optional metadata, for better experience classification. That is, if a user searches for example the term "Madonna," the experience classification may be for music, religion, movies, and more. Such metadata may be preset in the search server 120, or otherwise be constantly updated or calculated in real-time for a group of users or even on an individual basis to better fit a particular user's preferences, or can be entered by the user as part of the user query. For example, the search server 120 may determine based, in part, on search history that the user is a music fan, thus metadata related to a music classification is provided.

In another embodiment, the search server 120 is configured to provide metadata respective of the content used as a query provided to the resources and/or publishers, and the metadata may further include information about the geolocation of the user, so the publisher can provide location based results. For example, but without limitations, if a user is searching for Sushi, all the publishers may get the location of the user so they can provide restaurants and offers nearby the user's physical vicinity. It should be appreciated that entering search queries using such notation and metadata, simplifies the process of querying and increases the chances to retrieve results for the user's satisfaction. This approach together with novel techniques for displaying the returned results, as discussed above, enhance the users' searching experience, and specifically when searching through mobile phones and/or smart phones.

In S720, based on the input query, one or more resources are selected as being appropriate to provide answers respective of the received query. As mentioned above, the selection of one or more resources 130 is performed based on the input query, registration of the user to resources, and feedback provided by the user implicitly (e.g., which of the resources the user has been frequently using and for how long) or explicitly (e.g., using icons 430 and 630) when reviewing returned results and additional information, such as location, time of day, and/or others. Optionally, the order of the resources 130 is ranked so as to provide more appropriate resources 130 to the user of the user device 110 earlier in the search response. According to certain embodiments, various types of analyses can be executed on the input query.

In one type of analysis, a semantic analysis may be executed, wherein at least one action is extracted from the received query. This analysis of the received input query substantially determines what kind or type of information the user is searching for or what kind of action the user wants to execute. It is noted that the kind or type of information a user is looking for can be restated as an action which the user wishes to execute. Examples for such actions may be "comparing prices" of various items and objects, "listening to" music online or "viewing" images or video online. Thus, for example, the query including "watching Toy Story", and the user device installed with a Netflix native application, then one of the selected resources would be Netflix's servers.

In S730, the query is submitted to each of the selected resources of the resources 130. In S740, a display area on the user device 110 and provides for each of the selected resources of the resources 130 a corresponding display segment, for example, a display segment 320-2 is designated. Further, when applicable, one or more resources with authentication information, e.g., a user name and a password are provided. The user may be prompted to enter such information on behalf of some resource 130.

In S750, each of the selected resources of the resources 130 is enabled to communicate directly with the user device 110 for the purpose of interaction with the user in the uniquely designated display segment 320 for that resource. According to an embodiment, the interaction is enabled using a native application of the resource (e.g., a Netflix® player). This includes, for example, transferring to the designated display segment 230 executable code, such as hyper-text markup language (HTML) code, Java scripts, and code for causing a native application installed on the user device 110 to retrieve content/information from the resource. According to another embodiment, the interaction is enabled transferring to a display segment 230 code that returned as a result of a processing of a web application, and more, by one or more of the resources 130. In yet another embodiment, the interaction is enabled by displaying of multimedia content provided by one or more of the resources 130 in the display segment 230. Optionally, a step of collecting information for feedback and future ranking may be performed.

In S760, it is checked whether additional queries are to be handled by the search server 150 and if so execution continues with S710; otherwise, execution terminates.

It should be noted that the input (e.g., input 440), the display segments (e.g., display segments 320) and mini-display segments (e.g., mini-display segments 610) may be shown on a display area that can be a browser or another other appropriate application, either generic or tailored for the purposes described in detail hereinabove.

The various embodiments disclosed herein can be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. It should be noted that the input (e.g., input 440), the display segments (e.g., display segments 320) and mini-display segments (e.g., mini-display segments 610) may be shown on a display area that can be a browser or another other appropriate application, either generic or tailored for the purposes described in detail hereinabove.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computer implemented method for enhancing search experiences of users, comprising:
    receiving, at a search server, an input query and a metadata related to the input query sent from a user device;
    selecting, based on an analysis of the input query, at least one resource from a plurality of resources to respond to the input query and provide at least one answer to the input query;
    sending the input query as an input to the selected at least one resource, wherein the input is generated based on the at least one selected resource;
    providing, for each of the at least one selected resource, an associated respective single unique display segment within a display area on the user device, wherein content displayed in each unique display segment corresponds only to content retrieved by the corresponding selected resource, and wherein the associated respective single unique display segment is controlled on the user device at least through the use of software;
    causing the at least one selected resource to respond to the input within each corresponding unique display segment; and
    establishing a direct communication link between the at least one selected resource and the user device, without user intervention, for at least enabling direct interaction between the at least one selected resource and a user of the user device within each corresponding unique display segment.

2. The method of claim 1, further comprising:
    displaying a first mini-display segment over one of the at least one unique display segment, wherein the first mini-display segment displays an input from an application of a first display segment not shown in the display area.

3. The method of claim 2, further comprising:
    displaying a second mini-display segment over one of the at least one unique display segment, wherein the second mini-display segment displays an input from an application of a second display segment not shown in the display area.

4. The method of claim 3, wherein the first mini-display segment and the second mini-display segment are displayed as a slider function, thereby enabling the display of mini-display segments on the user device.

5. The method of claim 1, further comprising:
    ranking the at least one selected resource for display on the user device.

6. The method of claim 5, wherein the at least one selected resource is ranked based on a collection of data from previous searches including at least one of: an explicit feedback, and an implicit feedback.

7. The method of claim 1, wherein enabling the direct interaction between the at least one selected resource and the user via the unique display segment further includes:
    enabling a transfer, by the at least one selected resource, of executable code to each corresponding unique display segment.

8. The method of claim 7, wherein the executable code causes at least one of: activation of at least one native application in the unique display segment, rendering of a search result web page as generated by a web search engine in the unique display segment, and rendering of web page results from processing performed by a web application in the unique display segment.

9. The method of claim 1, further comprising:
    enabling transfer, through the direct communication link, of at least content generated by the at least one selected resource to each corresponding unique display segment.

10. A non-transitory computer readable medium having stored thereon instructions for causing one or more processing units to execute a method for enhancing search experiences of users, comprising:
    receiving, at a search server, an input query and a metadata related to the input query sent from a user device;
    selecting, based on an analysis of the input query, at least one resource from a plurality of resources to respond to the input query and provide at least one answer to the input query;
    sending the input query as an input to the selected at least one resource, wherein the input is generated based on the at least one selected resource;
    providing, for each of the at least one selected resource, an associated respective single unique display segment within a display area on the user device, wherein content displayed in each unique display segment corresponds only to content retrieved by the corresponding selected resource, and wherein the associated respective single unique display segment is controlled on the user device at least through the use of software;
    causing the at least one selected resource to respond to the input within each corresponding unique display segment; and
    establishing a direct communication link between the at least one selected resource and the user device, without user intervention, for at least enabling direct interaction between the at least one selected resource and a user of the user device within each corresponding unique display segment.

11. A system for enhancing search experiences of users, comprising:
    a processing system; and
    a memory, the memory containing instructions that, when executed by the processing system, configure the system to:
    receive, at a search server, an input query and a metadata related to the input query sent from a user device;
    select, based on an analysis of the input query, at least one resource from a plurality of resources to respond to the input query and provide at least one answer to the input query;
    send the input query as an input to the selected at least one resource, wherein the input is generated based on the at least one selected resource;

provide, for each of the at least one selected resource, an associated respective single unique display segment within a display area on the user device, wherein content displayed in each unique display segment corresponds only to content retrieved by the corresponding selected resource, and wherein the associated respective single unique display segment is controlled on the user device at least through the use of software;

cause the at least one selected resource to respond to the input within each corresponding unique display segment; and establish a direct communication link between the at least one selected resource and the user device, without user intervention, for at least enabling direct interaction between the at least one selected resource and a user of the user device within each corresponding unique display segment.

12. The system of claim 11, wherein the computing unit is further configured to:
display a first mini-display segment over one of the at least one unique display segment, wherein the first mini-display segment displays an input from an application of a first display segment not shown in the display area.

13. The system of claim 12, wherein the computing unit is further configured to:
display a second mini-display segment over one of the at least one unique display segment, wherein the second mini-display segment displays an input from an application of a second display segment not shown in the display area.

14. The system of claim 12, wherein the first mini-display segment and the second mini-display segment are displayed as a slider function, thereby enabling the display of mini-display segments on the user device.

15. The system of claim 11, wherein the computing unit is further configured to:
rank the at least one selected resource for display on the user device.

16. The system of claim 15, wherein the at least one selected resource is ranked based on a collection of data from previous searches including at least one of: an explicit feedback, and an implicit feedback.

17. The system of claim 11, wherein enabling the direct interaction between the at least one selected resource and the user via the unique display segment further includes:
enabling a transfer, by the at least one selected resource, of executable code to each corresponding unique display segment.

18. The system of claim 17, wherein the executable code causes at least one of: activation of at least one native application in the unique display segment, rendering of a search result web page as generated by a web search engine in the unique display segment, and rendering of web page results from processing performed by a web application in the unique display segment.

19. The system of claim 11, wherein the computing unit is further configured to:
enable transfer, through the direct communication link, of at least content generated by the at least one selected resource to each corresponding unique display segment.

20. The system of claim 11, wherein the system is connected to database containing information for the plurality of resources.

* * * * *